United States Patent [19]

Pirck et al.

[11] 4,110,282
[45] Aug. 29, 1978

[54] PROCESS FOR PREPARING A COLD-SET LACQUER

[75] Inventors: Dietrich Pirck, Seevetal; Gündolf Füchs, Hemmingstedt, both of Fed. Rep. of Germany

[73] Assignee: Deutsche Texaco Aktiengesellschaft, Hamburg, Fed. Rep. of Germany

[21] Appl. No.: 772,878

[22] Filed: Feb. 28, 1977

[30] Foreign Application Priority Data

Mar. 2, 1976 [DE] Fed. Rep. of Germany ....... 2608579

[51] Int. Cl.$^2$ ............................................... C09D 3/81
[52] U.S. Cl. ............................ 260/23 AR; 260/18 N; 260/29.2 N; 260/29.6 NR; 260/29.6 RB
[58] Field of Search .................. 260/23 AR, 29.6 NR, 260/29.6 RB, 29.2 N, 18 N

[56] References Cited

U.S. PATENT DOCUMENTS

| 2,450,940 | 10/1948 | Cowan et al. ...................... 260/18 N |
| 3,139,437 | 6/1964 | Peterson ............................. 260/18 N |
| 3,576,847 | 4/1971 | Troussier et al. .................... 526/292 |
| 3,582,507 | 6/1971 | Peerman ............................ 260/23 AR |
| 3,847,851 | 11/1974 | Tugukuni et al. .............. 260/23 AR |
| 3,879,324 | 4/1975 | Timmons et al. .............. 260/29.2 N |
| 4,013,604 | 3/1977 | Teer et al. ................... 260/29.6 RB |
| 4,031,048 | 6/1977 | Holmen et al. ..................... 260/18 N |

FOREIGN PATENT DOCUMENTS 2,410,822   9/1975   Fed. Rep. of Germany ...... 260/29.6 T

OTHER PUBLICATIONS

Chemical Abstracts, vol. 83, No. 22, Dec. 1, 1975, p. 181242n.
Chemical Abstracts, vol. 84, No. 8, Feb. 23, 1976, p. 46211g.

Primary Examiner—Ronald W. Griffin
Attorney, Agent, or Firm—Thomas H. Whaley; Carl G. Ries; Carl G. Seutter

[57] ABSTRACT

Cold-set lacquers are prepared by emulsifying acrylate monomers with 1 to 10 percent by weight of a cold cross-linkable comonomer in water, polymerizing, and adding to the resultant polymer dispersion, a dispersion of 3 to 15 percent by weight, based on the solids content of the polymer dispersion, of a water-soluble polyamino-amide and, optionally, usual additives. The lacquers give coatings which have good gloss and hardness and are at the same time water-resistant.

16 Claims, No Drawings

PROCESS FOR PREPARING A COLD-SET LACQUER

FIELD OF THE INVENTION

This invention relates to the preparation of lacquer. More particularly it relates to a process for preparing a cold-set lacquer.

BACKGROUND OF THE INVENTION

Paints based on aqueous polymer dispersions are widely used since they have two decisive advantages compared to paints based on film formers dissolved in organic solvents: they are not combustible; and they can be handled without causing any health hazard.

The aqueous polymer dispersions may be prepared by emulsifying the desired polymerizable monomer (e.g. acrylates such as ethyl acrylate; methacrylates such as methyl methacrylate; styrene; vinyl chloride; acrylonitrile; etc.) in water. Polymerization is initiated by addition of a water-soluble polymerization initiator, typically a per-compound.

An emulsifier is used in order to emulsify the water-insoluble monomer in the aqueous reaction mixture. However the emulsifier commonly has a harmful effect in that it may render the finished coating water-sensitive.

The prior art has heretofore attempted to obviate this disadvantage. Thus the amount of emulsifier has been reduced as far as possible; but only a relatively slight improvement in water-resistance has thereby been achieved. Other attempts to obtain dispersions from which water-proof coatings can be made have included the use of certain additives or special operating procedures.

For example W. German DT-OS No. 2,365,619 discloses that water resistance can be improved by addition of 1–10 w % (based on monomer) of a hydrocarbon or hydrocarbon mixture during or after emulsion polymerization.

W. German DT-OS No. 2,410,822 describes a process according to which emulsifier-free dispersions can be obtained containing only a small amount of polyvinyl alcohol as a protective colloid. The monomers are polymerized in a mixture of water, a water-miscible organic solvent, and a water-soluble, high molecular weight compound (containing hydroxyl, carboxyl, carboxylic amide, and/or ether groups), followed by precipitation of the polymers. The disadvantage of this process is that the organic solvent then must be at least partially removed by distillation under conditions such that the resin remains in the water as a disperse phase i.e., the dispersion must not be destroyed.

W. German DT-OS No. 1,795,757 discloses a cold crosslinkable acrylic resin dispersion prepared from (i) acrylates, and optionally other monomers, and (ii) halogenated acrylic esters or halogenated methacrylic esters. Because of the presence of the reactive halogen atoms, the copolymers can be vulcanized with various systems. These resins are however unsuitable as paints; and this specification does not discuss the problem of producing, from aqueous acrylic dispersions, a water-proof glossy coating.

The idea that an improvement in the gloss can be achieved by adding water-soluble resins to paint dispersions has been disclosed by K. Haman: *Development Tendencies in the Lacquer Field*, Farbe und Lack 907, Vol. 81 (1975). It is found that addition of a water-dilutable acid polyester to an aqueous acrylic resin dispersion permits attainment of coatings of improved gloss compared with coating obtained by use of the same acrylate dispersion without addition of polyester. However the water-resistance was unsatisfactory after subsequent cross-linking. When the acid polyester resin was replaced by a neutral, water-dilutable hydroxy polyether resin, no improvement in water-resistance of the matte coating was noted.

It is an object of this invention to provide a glossy water-proof paint based on an aqueous acrylic resin dispersion and a process for preparing the same. Other objects will be apparent to those skilled in the art.

STATEMENT OF THE INVENTION

In accordance with certain of its aspects, the novel process of this invention for preparing a cold-set lacquer for a glossy, water-proof coating may comprise forming a reaction mixture containing an aqueous emulsion including (i) emulsifier, (ii) acrylate monomers, and (iii) cold-cross-linkable co-monomers, adding polymerization initiator to said reaction mixture;

heating said mixture until the polymerization reaction starts;

adding to said mixture, at a temperature of from about 75° to 80° C., an aqueous pre-emulsion including further (i) emulsifier, (ii) acrylate monomers, and (iii) cold-cross-linkable comonomers;

a total of 1 to 10 percent by weight of cold-cross-linkable comonomers, based on the total amount of acrylate monomers, being employed;

and further polymerization initiator;

and adding after completion of polymerization to the resultant polymer dispersion from 3 to 15 percent by weight, based on the solids content of the polymer dispersion, of a polyaminoamide colloidally soluble in water.

DESCRIPTION OF THE INVENTION

Acrylate monomers which may be used in practice of the process of this invention may typically include the following:

(i) n-butyl acrylate, ethylhexyl acrylate, or other monomers which particularly contribute plasticizing properties;

(ii) isobutyl methacrylate, methyl methacrylate, methyl ethacrylate, acrylonitrile, or other monomers which particularly contribute adhesive properties to the final composition;

(iii) acrylic amides such as acrylamide se, methacrylamide, N-methylol ether of acrylamide, N-methylol ether of methacrylamide, etc.

(iv) hydroxyalkyl methacrylate such as hydroxyethyl methacrylate, hydroxypropyl methacrylate, hydroxybutyl methacrylate, etc;

(v) acrylic acid se; etc.

Acrylamide, acrylic acid, and hydroxyalkyl methacrylates (such as 2-hydroxypropyl methacrylate) are particularly desirable in that they favourably influence subsequent cross-linking of the product.

It should be noted that the paints prepared in practice of this invention may not be water-resistant immediately upon application; but after the cold, cross-linking polymer systems have been in place for about one week, they are found to be water-resistant. Maximum values of water-resistance may be reached after about three weeks.

Cold, cross-linkable comonomers which may be copolymerized with the acrylate monomer, in practice of the process of this invention include those which have a reactive radical or group such as hydroxyl, amino, chloroacetoxy, etc. Illustrative of preferred comonomers may be N-methylol acrylamide, hydroxypropyl methacrylate, or chloroacetoxyalkyl acrylates such as chloroacetoxyethyl acrylate
chloroacetoxypropyl acrylates
chloroacetoxybutyl acrylates
chloroacetoxyethyl methacrylate
chloroacetoxypropyl methacrylates
chloroacetoxybutyl methacrylates Polymerizable monomers having chloroacetoxy groups may be preferred - typically those listed in the listing supra.

A particularly preferred co-monomer may be 2-chloroacetoxyethyl methacrylate.

The co-monomer may be added to the reaction mixture neat or in a solution in e.g. the acrylate monomer. A preferred charge may contain 10-100 parts of 2-chloroacetoxyethyl methacrylate in 100-1000 parts of butyl acrylates. Preferably the co-monomers, e.g. 2-chloroacetoxyethyl methacrylate and hydroxypropyl methacrylate may be present in an amount of 10-35, say 32.5 parts per 200-700 parts, say 348 parts of acrylate monomer, based on the solids content.

In a typical embodiment for example, the reaction mixture may contain:

(i) acrylate monomer:acrylonitrile: 75-125 parts, preferably 90-100 parts, say 95 parts;
    isobutyl methacrylate: 100-250 parts, preferably 100-150 parts, say 125 parts; and
    n-butyl acrylate: 75-125 parts, preferably 90-100 parts, say 95 parts;

(ii) cold, cross-linkable comonomer chloroacetoxyethyl acrylate: 2.5-50 parts, preferably 10-40 parts, say 30 parts.

The reaction mixture may also contain 1-30, preferably 5-20, say 14 parts of emulsifier. The preferred emulsifier may be anionic or non-ionic. A mixture of anionic emulsifier and non-ionic emulsifier may be employed. Illustrative emulsifiers may include: soaps of higher fatty acids; fatty alcohol sulfonates such as sodium dodecyl sulfonate; ethoxylated compositions such as the ethylene oxide adduct of octylphenol or the ethylene oxide adduct of nonyl phenol. A specific preferred emulsifier may be sodium dodecyl sulfonate.

The polymerization initiator which may be employed may be 0.5-5 parts, preferably 1-4 parts, say 3 parts of a percompound. Typical are peroxides and persulfates such as ammonium persulfate, potassium persulfate, hydrogen peroxide, etc.

The polymerization reaction is performed in a manner known per se. In the first stage, the emulsifier(s) and the water-soluble acrylate monomer (by this term there is meant herein acrylic acid and acrylamide) as well as a part of the initiator are dissolved in water and a part of the water-soluble acrylate monomers and cross-linkable monomers added whilst thoroughly stirring. The reaction mixture is heated until polymerization begins which takes place at a temperature of about 75° to 80° C. An aqueous pre-emulsion containing the remaining acrylate monomers, cross-linkable monomers, and initiator is added so slowly whilst stirring that the temperature of about 80° C. is not exceeded.

Preferably after completion of polymerization, i.e., after about 3-5 hours total time, typically after about three hours from the initial addition of components to the reaction vessel, there is added a colloidal solution of a polyaminoamide colloid to the reaction mixture.

The polyaminoamides which may be used in practice of the process of the invention may typically include resinous products which are colloidally soluble in water and formed by reacting a dimerized or trimerized unsaturated fatty acid and (iii) a polyalkylene polyamine.

There are preferably used the polyaminoamides which have been introduced onto the market by the firm of Schering under the trademark Versamid 125 and Versamid 140. These are the reaction products of dimerized linoleic acid with polyalkylene amines. These products have the following properties:

| Versamid | 125 | 140 |
|---|---|---|
| Specific gravity | 0.98 | 0.98 |
| Amine number[1] | 290-320 | 350-400 |
| Acid number[2] | approx. 2 | approx. 1 |
| Colour number according to Gardner | max. 12 | max. 12 |
| Viscosity, poise at 25° C | 400-1000 | 100-300 |

[1] mg KOH which are equivalent to 1 g of Versamid
[2] mg KOH which are required for the neutralisation of Versamid The noted polyaminoamides may be added to the polymerization product in the reaction mixture after completion of polymerization in amount of 0.3-7.5 parts, preferably 2.4-7.2 parts, say 4.8 parts which corresponds to 3-15 wt.%, preferably 5-15 wt.%, say 5 wt.% of the dry weight of the copolymer.

The polyaminoamide may be added in the form of a colloidal solution containing 40-60 wt.%, preferably 45-55 wt.%, say 50 wt.% of polyaminoamide in aqueous medium, preferably water.

Other components, such as pigment, filler, opacifier, dyestuffs, etc. may be added to the composition.

It is a feature of this invention that the lacquers so prepared may be applied to form a coating typically 50-65 microns in thickness. Such coatings, when tested for pendulum impact hardness in accordance with Test DIN 53,157 are found to be outstanding. Their Gardner Gloss (as tested by DIN 67,350) and their water resistance are also found to be superior. The water resistance commonly increases substantially as the coating is allowed to set after application.

DETERMINATION OF THE WATER RESISTANCE

One drop of distilled water is placed on a lacquer-coated plate, a little hat placed thereover and the plate left for 60 minutes at 20° C. The appearance of the coat is then evaluated visually.

In order to summarize the broad range of the amounts of the several components, the preferred range, and a typical value, these numbers are hereinafter tabulated.

| Component | Range | Preferred | Typical |
|---|---|---|---|
| Acrylate Monomer | 100-1000 | 200-700 | 348 |
| Cold cross-linkable co-monomer | 1-100 | 2-70 | 35 |
| Emulsifier | 1-30 | 5-20 | 14 |
| Initiator | 0.5-5 | 1-4 | 3 |
| Aqueous Component | 50-500 | 100-300 | 200 |
| Pigments etc. | 10-100 | 20-70 | 60 |

DESCRIPTION OF PREFERRED EMBODIMENT

Practice of this invention may be observed from the following wherein, as elsewhere, all parts are parts by weight unless otherwise stated.

EXAMPLE I*

In this control example there is added to 100 parts of water, whilst stirring,
Emulsifier
  6 parts of a 50 wt.%—50 wt.% mixture of sodium dodecylsulfonate as an anionic emulsifier and of ethylene oxide adduct of nonylphenol as a non-ionic emulsifier, and
Water-Soluble Acrylates
  5.5 parts of acrylamide
  5.6 parts of acrylic acid
Polymerization Initiator
  1.7 parts of potassium persulfate
To this mixture is added, with agitation,
Acrylate Monomer
  37.5 parts of isobutyl methacrylate
  23.8 parts of butyl acrylate
  20.0 parts of acrylnitrile
Cold Cross-linkable Comonomer
  12.5 parts of hydroxypropyl methacrylate
  10.0 parts of a 50 wt.% solution of chloroacetoxyethyl acrylate This reaction mixture is heated under a gentle stream of nitrogen. The polymerization starts when the temperature is about 75° C.

At this point, there is added to the reaction mixture over a period of about one hour a "pre-emulsion" containing
Acrylate Monomers
  112.5 parts of isobutyl methacrylate
  73.8 parts of butyl acrylate
  60.0 parts of acrylonitrile
Cold-Cross-linkable Comonomer
  2.5 parts of hydroxypropyl methacrylate
  30.0 parts of a 50 wt.% solution of chloroacetoxyethyl acrylate
Emulsifier and Initiator
  100.0 parts of water
  8.0 parts of a 50 wt.%—50 wt.% mixture of sodium dodecylsulfate and ethylene oxide adduct of nonyl phenol
  1.3 parts of potassium persulfate.

The pre-emulsion is added so slowly that the temperature does not rise above 80° C.

At the end of this period, there is obtained an aqueous dispersion of finely-divided solids having a solids content of 60 wt.%.

There is then added to 100 parts of the dispersion (with vigorous stirring), the following pigment mixture:
  60 parts of titanium dioxide (rutile type);
  0.1 parts of "Byk-073" (Byk Gulden) anti-foaming agent;
  0.5 parts of "Pigmentverteiler A" (BASF) pigment distributing agent;
  40 parts of water.

The product dispersion so obtained is useful (as a control) in preparing a cold-set lacquer for a glossy water-proof coating.

All the following examples are carried out in the same manner except as specifically set forth hereinafter.

EXAMPLE II*

In this control example, the procedure of Example I is followed except that there is added to the pigment mixture:
  12 parts of a 50 percent aqueous solution of a hydroxy polyester which is neutralised with trimethylamine. The hydroxy polyester is the "Versuchsprodukt 940" of DEUTSCHE TEXACO AKTIENGESELLSCHAFT. It is built up from the polyols neopentylglycol, hexanediol, and trimethylpropane and the dicarboxylic acids 2-ethylhexane dicarboxylic acid and phthalic acid and is brought up to an acid number of about 50 with trimellitic acid. The hydroxyl number is about 5.0.

EXAMPLE III*

In this control example, the procedure of example I is followed except that there is added to the pigment mixture:
  6 parts of a hydroxylpolyether (Desmophen 550 U of Bayer, a hydroxyl group-containing, branched polyether having a hydroxyl content of 11.5 percent, an acid number of less than 0.5 and a viscosity at 25° C. of 650 ± 100 cps.), and
  6 parts of water.

EXAMPLE IV

In this example, carried out according to the process of this invention, there is added to the pigment mixture the following:
  5.2 parts of water, and
  4.8 parts of the polyaminoamide "Versamid 140" (as described above)

EXAMPLE V

In this example, carried out according to the process of this invention, there is added directly into the acrylate dispersion of example I immediately preceding the addition thereto of the pigment mixture, a pre-dispersion of the following:
  5.2 parts of water, and
  4.8 parts of the polyaminoamide "Versamid 140")

EXAMPLE VI

In this Example, carried out according to the process of this invention, the procedure of experimental Example V is followed except that the pre-dispersion, added immediately prior to the addition of the pigment mixture, contains the following:
  2.6 parts of water
  2.4 parts of the same polyaminoamide used in Example V.

EXAMPLE VII

In this Example, carried out according to the process of this invention, the procedure of experimental Example V is followed except that the pre-dispersion, added immediately prior to the addition of the pigment mixture, contains the following:
  7.8 parts of water
  7.2 parts of the same polyaminoamide used in Example V.

EXAMPLE VIII*

In this control Example, the procedure of Example V is followed except that the cold, cross-linkable comonomer (chloroacetoxyethyl acrylate) is omitted and, immediately preceding addition of the pigment mixture, there is added:

5.2 parts of water
4.8 parts of the polyaminoamide used in Example V.

Also tested (and listed as Example IX) is a commercially available cold-set lacquer for glossy water-proof coatings sold as an aqueous acrylate dispersion by the firm of Dr. Kurt Herberts under the trademark "Tacholit".

Results are tabulated in the Table which follows:
In the table, the following abbreviations are used:
C — chloroacetoxyethyl methacrylate
S — polyester
E — polyether
P — polyaminoamide
D — Days
W — Weeks In the case of Water Resistance, the numerical designations have the following significance:
0 — destroyed
1 — markedly swollen
2 — slightly swollen
3 — unchanged No entry in the Composition columns, means that a component is not present. The numbers in the composition columns represent wt.% additive, based on the total of composition.

From the paints obtained in Examples I–VIII, which contained a weight ratio of copolymer solids to titanium dioxide of 1:1, coatings were prepared of thickness of 50–65 microns. The coatings were tested for:
(i) pendulum impact hardness, in accordance with test DIN 53, 157,
(ii) Gardner gloss
in accordance with test DIN 67 530.
(iii) Water Resistance.

TABLE

| Example | Composition | | | | Pendulum Hardness | | | Glossy | | Water Resistance | | |
|---|---|---|---|---|---|---|---|---|---|---|---|---|
| | C | S | E | P | 3D | 7D | 4W | 20° | 45° | 3D | 7D | 4W |
| I* | 5 | | | | 52 | 60 | 64 | 12 | 48 | 0 | 0 | 0 |
| II* | 5 | 5 | | | 46 | 51 | 60 | 29 | 65 | 0 | 0 | 0 |
| III* | 5 | | 5 | | 28 | 30 | 41 | 3 | 35 | 0 | 0 | 0 |
| IV | 5 | | | 8 | 45 | 46 | 61 | 7 | 42 | 2 | 2 | 3 |
| V | 5 | | | 8 | 49 | 60 | 65 | 20 | 69 | 2 | 2 | 3 |
| VI | 5 | | | 4 | 45 | 58 | 60 | 26 | 57 | 1 | 2 | 3 |
| VII | 5 | | | 12 | 47 | 56 | 63 | 8 | 47 | 2 | 2 | 3 |
| VIII* | 5 | | | 8 | 27 | 36 | 45 | 14 | 59 | 0 | 1 | 1 |
| IX* | | | | | 36 | 43 | 54 | 3 | 30 | 0 | 0 | 1 |

*Control examples

From the above table it is apparent that the most satisfactory results are attained in experimental Examples IV–VII in which the polyaminoamide is present. The lacquers in accordance with the invention have about the same and in some cases even better hardness and gloss than the lacquers of the comparative examples and are, in addition, water-resistant: in other words, they have the desired combination of properties.

More importantly, it will be noted that the water resistance of the samples of experimental examples IV–VII rises after 4 weeks of curing, at ambient conditions prior to water-testing, to the desired level of 3 i.e., the sample is unchanged during testing, if it is allowed to stand for four weeks prior to testing.

Although this invention has been illustrated by reference to specific embodiments, it will be apparent to those skilled in the art that various changes and modifications may be made which clearly fall within the scope of this invention.

We claim:

1. The process for preparing a cold-set lacquer for a glossy, water-proof coating which comprises
   forming a reaction mixture containing an aqueous emulsion including (i) 1–30 parts of emulsifier, (ii) 100–1000 parts of acrylate monomers, and (iii) 1–100 parts of cold-cross-linkable co-monomers;
   adding 0.5–5 parts of polymerization initiator to said reaction mixture and heating to about 75° C.;
   adding to said mixture, at a temperature of from about 75° to 80° C., an aqueous pre-emulsion including further (i) emulsifier, (ii) acrylate monomers, and (iii) cold-cross-linkable co-monomers;
   a total of 1 to 10 percent by weight of cold-cross-linkable co-monomers, based on the total amount of acrylate monomers, being employed;
   and further polymerization initiator;
   and adding after completion of polymerization to the resultant polymer dispersion from 3 to 15 percent by weight, based on the solids content of the polymer dispersion, of a polyaminoamide colloidally soluble in water.

2. The process for preparing a cold-set lacquer for a glossy water-proof coating as claimed in claim 1 wherein the acrylate monomer contains an alkyl acrylate or an alkyl methacrylate.

3. The process for preparing a cold-set lacquer for a glossy water-proof coating as claimed in claim 1 wherein the acrylate monomer contains n-butyl acrylate.

4. The process for preparing a cold-set lacquer for a glossy water-proof coating as claimed in claim 1 wherein the acrylate monomer contains isobutyl methacrylate.

5. The process for preparing a cold-set lacquer for a glossy water-proof coating as claimed in claim 1 wherein the acrylate monomer contains acrylamide.

6. The process for preparing a cold-set lacquer for a glossy water-proof coating as claimed in claim 1 wherein the acrylate monomer contains acrylic acid.

7. The process for preparing a cold-set lacquer for a glossy water-proof coating as claimed in claim 1 wherein the cold-cross-linkable co-monomer includes a polymerizable monomer bearing a hydroxyl group, an amino group, or a chloroacetoxy group.

8. The process for preparing a cold-set lacquer for a glossy water-proof coating as claimed in claim 1 wherein the cold-cross-linkable co-monomer contains an acrylate or methacrylate bearing a hydroxyl group, an amino group or a chloroacetoxy group.

9. The process for preparing a cold-set lacquer for a glossy water-proof coating as claimed in claim 1 wherein the cold-cross-linkable co-monomer contains chloroacetoxyethyl acrylate.

10. The process for preparing a cold-set lacquer for a glossy water-proof coating as claimed in claim 1 wherein said emulsifier is an anionic or a non-ionic emulsifier.

11. The process for preparing a cold-set lacquer for a glossy water-proof coating as claimed in claim 1 wherein said polymerization initiator is a persulfate or a peroxide.

12. The process for preparing a cold-set lacquer for a glossy water-proof coating as claimed in claim 1 wherein said polyaminoamide is a resinous product which is colloidally soluble in water.

13. The process for preparing a cold-set lacquer for a glossy water-proof coating as claimed in claim 1 wherein said polyaminoamide is the reaction product of (i) a dimerized unsaturated fatty acid and (ii) a polyalkylene polyamine.

14. The process for preparing a cold-set lacquer for a glossy water-proof coating as claimed in claim 1 wherein said polyaminoamide is the reaction product of dimerized linoleic acid and a polyalkylene polyamine having a viscosity of 400–1000 poise.

15. The process for preparing a cold-set lacquer for a glossy water-proof coating as claimed in claim 1 which comprises forming an aqueous emulsion including 80–120 parts of water, (i) 4–8 parts of emulsifier, (ii) 8–14 parts of water-soluble acrylate monomers and 60–100 parts of water-insoluble acrylate monomers, 1–3 parts of polymerization initiator and (iii) 15–18 parts of cold-cross-linkable co-monomers, solid basis; heating said resulting emulsion until the polymerization reaction starts, adding to said emulsion at a temperature of about 75°–80° C. a pre-emulsion including (i) 6–10 parts of emulsifier, (ii) 220–260 parts of water-insoluble acrylate monomers, (iii) 15–18 parts of cold-cross-linkable co-monomers, solid basis, a total of 1–10 percent by weight of cold-cross-linkable co-monomers, based on the total amount of the acrylate monomers, being used;

and 80–120 parts of water, 6–10 parts of emulsifier, and 1–2.5 parts of polymerization initiator;

adding to the resulting aqueous dispersion having a solids content of about 60 percent by weight, 3–15 percent by weight, based on the solids content of the dispersion, of a colloidal solution containing 40–60 weight % of polyaminoamide in water.

16. The process for preparing a cold-set lacquer for a glossy, water-proof coating which comprises forming a reaction mixture containing an aqueous emulsion including (i) 1–30 parts of emulsifier, (ii) 100–1000 parts of acrylate monomers; and (iii) 1–100 parts of cold-cross-linkable co-monomer;

adding 0.5–5 parts of polymerization initiator to said reaction mixture and heating to about 75° C.;

adding to said mixture, at a temperature of from about 75° to 80° C., an aqueous pre-emulsion including further (i) emulsifier, (ii) acrylate monomers, and (iii) cold-cross-linkable co-monomer;

a total of 1 to 10 percent by weight of cold-cross-linkable co-monomer, based on the total amount of acrylate monomers, being employed;

and further polymerization initiator;

and adding after completion of polymerization to the resultant polymer dispersion from 3 to 15 percent by weight, based on the solids content of the polymer dispersion, of a polyaminoamide colloidally soluble in water.

* * * * *